United States Patent
Justel et al.

(10) Patent No.: US 7,591,962 B2
(45) Date of Patent: Sep. 22, 2009

(54) LOW-PRESSURE MERCURY VAPOR DISCHARGE LAMP COMPRISING UV-A PHOSPHOR

(75) Inventors: Thomas Justel, Witten (DE); Walter Mayr, Alsdorf (DE); Helmut Bechtel, Roetgen (DE); Peter Schmidt, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 311 days.

(21) Appl. No.: 11/569,253

(22) PCT Filed: May 17, 2005

(86) PCT No.: PCT/IB2005/051601

§ 371 (c)(1),
(2), (4) Date: Nov. 17, 2006

(87) PCT Pub. No.: WO2005/116164

PCT Pub. Date: Dec. 8, 2005

(65) Prior Publication Data

US 2007/0228924 A1    Oct. 4, 2007

(30) Foreign Application Priority Data

May 27, 2004    (EP) .................... 04102335

(51) Int. Cl.
*C09K 11/81*    (2006.01)
*H01J 61/72*    (2006.01)

(52) U.S. Cl. .................. 252/301.4 P; 252/301.4 R; 313/486; 313/487; 313/639; 313/635; 607/94

(58) Field of Classification Search ........... 252/301.4 P, 252/301.4 R; 313/486, 487, 639, 635; 607/94
See application file for complete search history.

(56) References Cited

U.S. PATENT DOCUMENTS

| | | | | |
|---|---|---|---|---|
| 4,266,137 A | * | 5/1981 | Shaffer | 250/482.1 |
| 5,714,835 A | * | 2/1998 | Zachau et al. | 313/486 |
| 6,979,415 B1 | * | 12/2005 | Krishna et al. | 252/301.4 P |

FOREIGN PATENT DOCUMENTS

| | | | |
|---|---|---|---|
| EP | 0924746 A1 | | 6/1999 |
| EP | 1108772 | * | 6/2001 |
| EP | 1108772 A2 | | 6/2001 |
| JP | 54056086 A | | 5/1979 |
| WO | 0217352 A1 | | 2/2002 |
| WO | WO 02/17352 | | 2/2002 |
| WO | WO 03/100821 | * | 12/2003 |
| WO | 2004008485 A1 | | 1/2004 |
| WO | 2004099341 A1 | | 11/2004 |

* cited by examiner

*Primary Examiner*—C. Melissa Koslow

(57) ABSTRACT

The invention is concerned with a low-pressure mercury vapor discharge lamp comprising a light-transmitting discharge vessel, said discharge vessel enclosing, in a gastight manner, a discharge space provided with a filling of mercury, at least a part of a wall of the discharge vessel being provided with a luminescent composition comprising a first UV-A phosphor of general formula $(Gd_{1-x-y-z}Y_xLu_y)PO_4:Ce_z$, wherein $0 \leq x < 1.0$, $0 \leq y < 1.0$, $0 < z \leq 0.2$ and $x+y+z<1$, the low-pressure mercury vapor discharge lamp comprising also discharge means for igniting and maintaining an electric discharge in the discharge vessel.

Such lamp is especially useful for tanning purposes as well as cosmetic and medical purposes.

The invention is also concerned with an UV-A phosphor of general formula $(Gd_{1-x-y-z}Y_xLu_y)PO_4:Ce_z$, wherein $0 \leq x < 1.0$, $0 \leq y < z \leq 0.2$ and $x+y+z<1$.

12 Claims, 3 Drawing Sheets

LOW-PRESSURE MERCURY VAPOR DISCHARGE LAMP COMPRISING UV-A PHOSPHOR

The invention relates to a low-pressure mercury vapor discharge lamp comprising a light-transmitting discharge vessel, said discharge vessel enclosing, in a gastight manner, a discharge space provided with a filling of mercury, at least a part of an inner wall of the discharge vessel being provided with at least one layer of a luminescent material comprising an UV-A phosphor, the low-pressure mercury vapor discharge lamp comprising also discharge means for igniting and maintaining an electric discharge in the discharge vessel.

Mercury constitutes the primary discharge-maintaining component for generating ultraviolet radiation in mercury vapor discharge lamps. A luminescent layer comprising a luminescent material is present on an inner wall of the discharge vessel for converting the primary UV radiation, generated from the mercury vapor discharge, to other wavelengths, for example to UV-B and UV-A for tanning purposes or to visible radiation for general illumination purposes.

This invention relates especially to a low pressure fluorescent mercury vapor discharge lamp having a particular type of luminescent material to emit skin tanning radiation when excited by the ultraviolet radiation, generated from the mercury vapor discharge.

Most fluorescent lamps available for inducing tanning of human skin are designed to have a spectrum of Immediate Pigment Darkening (IPD), exemplified by the DIN Direct Pigmentation Spectrum 5031, and therefore emit predominantly UV-A radiation in the range of 320 nanometers to 400 nanometers. Lamps of this design generally emit a minimum of UV-B radiation in the range of 260 nanometers to 320 nanometers, which is believed to cause the formation of melanin. The skin pigment melanin, primarily formed under the influence of UV-B radiation, only darkens in a tanning process under the influence of UV-A radiation.

The most suitable luminescent material for the generation of UV-A light in tanning lamps comprises $BaSi_2O_5$:Pb and $Sr_2MgSi_2O_7$:Pb, due to their high efficiency under excitation by 185 nm and 254 nm radiation generated by mercury. They have an emission peak at about 350 nm and a half-value width of 40 to 50 nm. These phosphors, hence, emit light primarily in the UV-A region and thus substantially contribute only to darkening the pigments in the skin that are already present.

Lamps for tanning purposes according to DIN5031 may comprise an additional UV-B phosphor, i.e. either $SrAl_{12}O_{19}$:Ce or $LaPO_4$:Ce to enhance the amount of UV-B radiation emitted by the lamp for forming new melanin pigment in the skin.

The UV-A phosphor primarily used is $BaSi_2O_5$:Pb. It is generally known, e.g. from WO0217352, that $BaSi_2O_5$:Pb is mainly responsible for the strong degradation of the UV-A output of mercury vapor discharge lamps comprising such a phosphor. $BaSi_2O_5$:Pb comprises a silicate host lattice, which is not inert to mercury present in the discharge. Such silicate materials have the tendency to absorb mercury, which results in the formation of an absorption layer during lamp operation This does not only imply that more mercury should be present in the discharge vessel so as to ensure that the discharge lamp remains in operation during its lifetime, but also that the efficiency of the discharge lamp during its lifetime gradually decreases because many Hg compounds absorb UV and/or visible light.

An additional problem in lamps using an UV-A/UV-B phosphor blend comprising $BaSi_2O_5$:Pb is that the degradation of $BaSi_2O_5$:Pb changes the spectral power distribution in the UV and thus the UV-B/UV-A ratio and other lamp specifications.

A widely applied method to reduce the UV light output decrease and the spectral change is the addition of nanoparticles of $Al_2O_3$ (alon-c), which are added in a quantity of 1 to 8% alon-c.

A much better approach would be the replacement of the silicate phosphors, such as $BaSi_2O_5$:Pb, by luminescent materials having a much lower mercury consumption.

Accordingly, the object of the invention is to provide a low pressure mercury vapor discharge lamp, particularly for suntanning purposes, which has a higher UV-A and UV-B output, a longer lifetime and improved lumen maintenance.

In accordance with the invention, this object is achieved by a low-pressure mercury vapor discharge lamp comprising a light-transmitting discharge vessel, said discharge vessel enclosing, in a gastight manner, a discharge space provided with a filling of mercury, at least a part of a wall of the discharge vessel being provided with a luminescent material comprising a first UV-A phosphor of the general formula $(Gd_{1-x-y-z}Y_xLu_y)PO_4$:$Ce_z$, wherein $0 \leq x < 1.0$, $0 \leq y < 1.0$; $0 < z \leq 0.2$ and $x+y+z < 1$, the low-pressure mercury vapor discharge lamp comprising also discharge means for igniting and maintaining an electric discharge in the discharge vessel.

A low-pressure mercury vapor discharge lamp according to the invention comprising a luminescent material with an UV-A phosphor of the general formula $(Gd_{1-x-y-z}Y_xLu_y)PO_4$:$Ce_z$, wherein $0 \leq x < 1.0$, $0 \leq y < 1.0$; $0 < z \leq 0.2$ and $x+y+z < 1$, appears to be very well resistant to the action of the mercury-rare gas atmosphere which, in operation, prevails in the discharge vessel of the low-pressure mercury vapor discharge lamp. As a result, blackening due to interaction between mercury and the UV-A phosphor is reduced, resulting in an improvement of the maintenance. During the service life of the discharge lamp, a smaller quantity of mercury is withdrawn from the discharge, so that, in addition, a reduction of the mercury consumption of the discharge lamp is obtained and in the manufacture of the low-pressure mercury vapor discharge lamp a smaller mercury dose will suffice.

It may be preferred that the luminescent composition comprises also a second UV-A phosphor selected from the group comprising $SrB_4O_7$:Eu, $LaMgAl_{11}O_{19}$:Ce, or a blend thereof.

It may also be preferred that the luminescent composition also comprises an UV-B-phosphor. Such an UV-B phosphor may be selected from the group comprising $SrAl_{12}O_{19}$:Ce, $(La_{1-x}Gd_x)PO_4$:Ce, or a blend thereof.

Such lamps show a more constant spectral power distribution in the UV during their operational lifetime than the conventional lamp.

The UV-A-phosphor may be present in a first luminescent layer and the UV-B phosphor in a second luminescent layer.

It may also be preferred that the luminescent composition further comprises an additive selected from the group comprising $Al_2O_3$, MgO, or $MgAl_2O_4$ to prevent mercury deposition on the phosphors and the glass walls of the discharge vessel.

The low-pressure mercury vapor lamp according to the invention may be used preferably for tanning purposes, but also for cosmetic and medical purposes.

According to a second aspect of the invention, an UV-A phosphor of the general formula $(Gd_{1-x-y-z}Y_xLu_y)PO_4$:$Ce_z$, wherein $0 \leq x < 1.0$, $0 \leq y < 1.0$; $0 < z \leq 0.2$ and $x+y+z < 1$ is provided.

An UV-A phosphor of the general formula $(Gd_{1-x-y-z}Y_xLu_y)PO_4$:$Ce_z$, wherein $0 \leq x < 1.0$, $0 \leq y < 1.0$; $0 < z \leq 0.2$ and $x+y+z<1$ is a very bright crystalline phosphor, i.e. this UV-A radiation-emitting phosphor combines a very good absorption in the VUV range with a very high emission quantum yield above 80%. Unlike other phosphors, this phosphor is hardly degraded by the VUV radiation. It has a longer lifespan and an improved luminance in spite of the fact that it does not contain lead.

The host matrix of this UV-A phosphor does not contain silicate. Due to the lower Hg absorption of a phosphor layer not comprising any silicate, lamps with a lower Hg content can be made.

In addition, the phosphor composition and its spectrum can be substantially changed to meet the required specifications of a tanning lamp in terms of the spectral power distribution in the UV-A/UV-B range of the spectrum.

Particularly advantageous effects of the invention in comparison with the state of the art are obtained with an UV-A phosphor of the general formula $(Gd_{1-x-y-z}Y_xLu_y)PO_4:Ce_z$, wherein $x=0.5$, $y=0$; $0<z\leq0.1$ and $x+y+z<1$, which has an additional high yield in the UV-B range of the spectrum.

Within the scope of the invention, it is preferred that the UV-A phosphor comprises a co-activator selected from the group comprising Tb(III), Eu(II), Mn(II) and Sb(III) in its host lattice.

The UV-A phosphor according to the invention may additionally comprise an anion, selected from the group comprising arsenate and vanadate.

In accordance with a preferred embodiment of the invention, the UV-A phosphor has a grain size of 10 nm<d<500 nm.

A phosphor layer containing an UV-A phosphor having a grain size in the nano-range forms a very dense layer that satisfactorily shields the phosphor from the mercury plasma. In addition, this very dense layer causes the recombination of mercury ions and electrons on the surface of the phosphor layer to be reduced.

These and other aspects of the invention will be apparent from and elucidated with reference to the embodiment described hereinafter.

The present invention focuses on a cerium-activated orthophosphate of the rare earth metals, selected from the group of gadolinium, yttrium and lutetium, of general formula $(Gd_{1-x-y-z}Y_xLu_y)PO_4:Ce_z$, wherein $0\leq x<1.0$, $0\leq y<1.0$; $0<z\leq0.2$ and $x+y+z<1$, as a phosphor in any configuration of a low pressure mercury vapor discharge lamp.

The UV-A phosphor according to the invention or the luminescent material comprising such a phosphor absorbs the radiation emitted by the low-pressure mercury discharge and converts said radiation into radiation with a longer wavelength. By a suitable choice of an UV-A radiation-emitting phosphor of general formula $(Gd_{1-x-y-z}Y_xLu_y)PO_4:Ce_z$, wherein $0\leq x<1.0$, $0\leq y<1.0$; $0<z\leq0.2$ and $x+y+z<1$, the light emitted by the low-pressure gas discharge lamp can be given any desired wavelength in the range of 300 nanometers to 325 nanometers.

While the use of the present phosphor is contemplated for a wide array of illumination, especially for cosmetic and medical purposes, the present invention is described with particular reference to and finds particular application in low-pressure mercury vapor discharge lamps for sun-tanning purposes.

In general, the UV-A phosphors and luminescent compositions used for the invention generate light similar to natural sunlight for sun-tanning lamps.

It may be alternatively preferred, however, to use UV-A phosphors of general formula $(Gd_{1-x-y-z}Y_xLu_y)PO_4:Ce_z$, wherein $0\leq x<1.0$, $0\leq y<1.0$; $0<z\leq0.2$ and $x+y+z<1$ as the UV-A emitting phosphors and in luminescent materials in order to manufacture a lamp for medical purposes, where a spectrum with a higher amount of UV-A emission.

Referring to FIG. 1, there is shown a low-pressure mercury vapor discharge lamp according to one embodiment of the invention.

The low-pressure mercury vapor gas discharge lamp is composed of a rod, ring or U-shaped tubular lamp bulb 1, which forms the gas discharge vessel for the low-pressure mercury gas discharge.

As the discharge assembly, the usual electrode structure 2 is sealed in at both ends of the bulb, via which electrode structure the gas discharge can be ignited. Two-pin caps 3 serve as the connection means.

The discharge sustaining filling in the sealed glass tube comprises a small quantity of mercury in combination with an inert gas, such as argon or a mixture of argon and other gases, at a low pressure to provide the low vapor pressure manner of lamp operation.

The low-pressure mercury discharge lamp further comprises means for generating and maintaining a low-pressure mercury gas discharge, such as a choke and a starter.

If rendered luminescent under operating conditions, the discharge sustaining filling emits the Hg resonance lines at approximately the following wavelengths: 185.0 nm, 253.7 nm, 406 nm and 436 nm, which is converted to UV-A/UV-B radiation by the luminescent composition comprising $(Gd_{1-x-y-z}Y_xLu_y)PO_4:Ce_z$, wherein $0\leq x<1.0$, $0\leq y<1.0$; $0<z\leq0.2$ and $x+y+z<1$.

Dependent upon the desired UV-A/UV-B ratios, it is possible to use distinct single ultraviolet luminescent compositions comprising an UV-A phosphor according to the invention.

Otherwise, different luminescent compositions producing different ultraviolet spectral energy distributions or tanning strengths are easily obtained by mixing an UV-A phosphor according to the invention with a known fluorescent material generating different radiation intensities to provide coatings which produce the desired radiation intensity.

In particular, $SrAl_{12}O_{19}:Ce$ and $(La_{1-x}Gd_x)PO_4:Ce$ are well known fluorescent phosphor materials for producing UV-B radiation, as are $SrBr_4O_7:Eu$ and $LaMgAl_{11}O_{19}:Ce$.

These well known UV-producing fluorescent phosphor materials may be mixed in different proportions to produce the desired UV radiation ratio and intensity, and hence predetermined tanning strengths.

In the embodiment of the invention shown in FIG. 1, the inside of the glass tube is provided with a first phosphor layer 4. Said first phosphor layer 4 contains a UV-A phosphor or a UV-A phosphor mixture. The outside of the first phosphor layer is provided with a second phosphor layer 4' containing a UV-B phosphor.

The inner phosphor layer containing a UV-A phosphor shields the outer phosphor layer from radiation originating from the mercury discharge. This applies, in particular, when the UV-A phosphor has a grain size in the nano-range, so that thisphosphor layer is very dense and closed.

Therefore, a phosphor coating composed of two phosphor layers proved to be advantageous.

Alternatively, the phosphor coating may consist of a single phosphor layer on the inner wall of the gas discharge vessel, which phosphor layer contains the UV-A phosphor alone or with a second phosphor.

In this embodiment, the UV-A phosphor can replace the filling agent, which is customarily added to the phosphor layer to obtain a uniform light radiation. This applies particularly when a phosphor with a grain size in the nano-range is used as the UV-A phosphor.

The luminescent material is composed so as to produce a coating which consistently has the desired emission 5. Preferably, the UV-A phosphor is added in a quantity of 75 to 85% by weight with respect to the phosphor coating.

The most preferred phosphor mix contains 81% UV-A phosphor according to the invention, 16.5% UV-B type phosphor, with the small balance being a red emitting phosphor.

If an AC voltage is applied to the electrodes, an electric gas discharge can be ignited in the gas filling containing mercury and argon. As a result, a plasma is formed comprising gas atoms or molecules that are excited or ionized. When the atoms return to the ground state, as occurs when electrons and ions are recombined, a more or less substantial part of the potential energy is converted into UV radiation having wavelengths of 104 nm (Ar), 106 nm (Ar), 185 nm (Hg), 254 nm (Hg) and into visible radiation.

This conversion of electron energy into UV radiation takes place very efficiently in the mercury low-pressure gas discharge.

The generated VUV photons having a wavelength of 104 nm (Ar), 106 nm (Ar) and 185 nm (Hg) are absorbed by the UV-A phosphor and the excitation energy is released again in the longer UV-A wavelength range of the spectrum. The absorption coefficient of the phosphors activated with $Ce^{3+}$ is very high for the wavelengths in the VUV range of the spectrum, and the quantum yield is high. The host lattice influences the exact position of the energy level of the activator ion and hence the emission spectrum.

According to a second aspect of the invention, a luminescent material is provided comprising, as an UV-A-emitting phosphor, an anhydrous cerium-activated gadolinium-yttrium-lutetium orthophosphate. The phosphor conforms to the general formula $(Gd_{1-x-y-z}Y_xLu_y)PO_4:Ce_z$, wherein $0 \leq x < 1.0$, $0 \leq y < 1.0$; $0 < z \leq 0.2$ and $x+y+z<1$.

This class of phosphor material is based on activated luminescence of a ternary rare earth metal orthophosphate, comprising, as rare earth metals, gadolinium, cerium and at least one earth alkali metal selected from the group comprising yttrium and lutetium.

Cerium-activated gadolinium yttrium lutetium orthophosphate is a crystalline solid composed of a host lattice of gadolinium yttrium lutetium orthophosphate that is activated with a small amount (e.g. 0.2 atomic percent of Ce relative to Lu) of the rare-earth metal dopant cerium (Ce).

Depending on the specific proportion of gadolinium, yttrium and lutetium, the host lattice will either form a crystal structure of the xenotime type or the monazite type.

Both crystal structures belong to an informal group of phosphates called the anhydrous phosphates along with purpurite and lithiophyllite. Also of note is that xenotime and monazite are among the few phosphate minerals that do not contain water molecules, hydroxides or chlorides.

The structure may contain minor amounts of vanadate and arsenate replacing the phosphate anion. In fact it forms a solid solution series with these anions. It is unusual to have a solid solution series involving the principle anions, but in this case it is not a complete solid solution series.

It may further comprise impurity traces, e.g. Ti; Er; La, Al; Si, Zr.

Crystallographic Properties of Xenotime

| Crystal System: | Tetragonal |
|---|---|
| Class (H-M): | 4/m - Dipyramidal |
| Space Group: | $I4_1/a$ |

Crystallographic Properties of Monazite

| Crystal System: | Monoclinic |
|---|---|
| Class (H-M): | 2/m - Prismatic |
| Space Group: | $P2_1/m$ |

If the larger cation, i.e. gadolinium, preponderates in the composition of the specific phosphor, the monazite type structure will be adopted, wherein the cations have an irregular nine-fold coordination.

If the smaller cations yttrium and lutetium prevail in the composition of the specific phosphor, the xenotime structure will be adopted, wherein the cations have a regular eight-fold coordination.

The phase transition is easily visible by the emission spectrum, since due to the presence of the monazite structure, an intense emission band at 320 nm shows up. This is the case in $(Y_{1-x}Ce_x)PO_4$, if x is larger than 0.15, i.e. if the $Ce^{3+}$ concentration is higher than 15%.

The host lattice of the UV-A phosphor of general formula $(Y_{1-x-y-z}Gd_xLu_y)PO_4:Ce_z$, wherein $0<x \leq 0.7$, $0<y<1$; $0<z \leq 0.2$ and $x+y+z<1$ is doped with a few percent of cerium as an activator.

Cerium is an excellent activator, because both its ground state and excited states lie within the band gap of about 6 eV of the host lattice.

A co-activator may be present. Such a co-activator often is a rare earth metal ion like, for example, Eu(II), Tb(III), or a main group element such as Mn(II) or Sb(III).

UV-A phosphors according to the above-mentioned composition show a high quantum efficiency (>80%) and a strong absorption of 185 and 254 nm radiation. These phosphors emit UV-A radiation comprising two bands in the wavelength range between 325 and 365 nm.

The emission spectra of the UV-A phosphors $(Gd_{1-x-y-z}Y_y)PO_4:Ce_z$ resemble that of $YPO_4:Ce$, i.e. it exhibits two emission bands due to the 5d4f transitions of $Ce^{3+}$ at 335 and 355 nm. However, if x is larger than 0.5, a further emission band at 320 nm shows up, indicating the presence of the Monazite phase, which becomes dominant. In addition to that, the incorporation of $Gd^{3+}$ results in the presence of a weak emission line due to a 4f-4f transition of $Gd^{3+}$ at 311 nm. This emission line enhances the relative amount of UV-B radiation in the emission spectrum $(Gd_{1-x-y-z}Y_y)PO_4:Ce_z$.

These findings demonstrate that the system $(Gd_{1-x-y-z}Y_y)PO_4:Ce_z$ shows an emission spectrum which depends on the parameters x, y, and z. While x hardly has an impact on the effective emission spectrum, the relative UV-B content of the emission spectrum increases by increasing y and z. In this way, the phosphor composition can be optimized to the desired specifications of a fluorescent tanning lamp.

The following table summarizes the efficiency and specifications of tanning lamps comprising a single phosphor according to different compositions of $(Gd_{1-x-y-z}Y_y)PO_4:Ce_z$, wherein x=0.0.

TABLE 1

Specifications of tanning lamps comprising a phosphor according to the composition $(Gd_{1-x-y-z}Y_y)PO_4:Ce_z$ as a luminescent layer in comparison prior art $YPO_4:Ce$.

| Composition | UVA [W] | UVB [W] | UV total [W] | UVB [% UV total] | UVB [% UVA] | UVA1 [W] | UVA2 [W] | UVA1/ UVA2 | EryB [mW] | EryA [mW] | EryTotal [mW] |
|---|---|---|---|---|---|---|---|---|---|---|---|
| Y = 0.5, z = 0.10 | 26.88 | 0.76 | 27.64 | 4.37 | 4.56 | 15.89 | 10.41 | 1.42 | 0.070 | 0.026 | 0.096 |
| Y = 0.5, z = 0.05 | 27.57 | 0.37 | 27.95 | 2.18 | 2.23 | 17.24 | 10.03 | 1.59 | 0.037 | 0.025 | 0.062 |
| Y = 1.0, z = 0.10 | 28.90 | 0.27 | 29.17 | 1.55 | 1.57 | 20.28 | 8.47 | 2.24 | 0.029 | 0.023 | 0.052 |
| Y = 1.0, z = 0.05 | 28.60 | 0.38 | 28.97 | 2.14 | 2.18 | 19.51 | 8.87 | 2.05 | 0.039 | 0.023 | 0.062 |

These UV-A phosphors are preferably used in a grain size distribution in the nano-range and an average grain size of 10 to 500 nm.

The grain size is determined by the properties of the phosphor to absorb UV radiation and absorb as well as scatter visible radiation, but also by the necessity to form a phosphor coating that bonds well to the glass wall. The latter requirement is met only by very small grains, the light output of which is smaller, however, than that of slightly larger grains.

The manufacture of the phosphors is customarily carried out by means of a solid-state reaction of the starting compounds in the form of fine-grain powders having a grain size distribution between 0.5 and 1 μm.

To apply the phosphors to the walls of the gas discharge vessel use is customarily made of a flooding process. The coating suspensions for the flooding process contain water or an organic compound such as butyl acetate as the solvent. The suspension is stabilized by adding auxiliary agents, for example cellulose derivatives, polymethacrylic acid or polypropylene oxide, and influenced in its Theological properties. Customarily, use is made of further additives such as dispersing agents, defoaming agents and powder conditioning agents, such as aluminum oxide, aluminum oxynitride or boric acid. The phosphor suspension is provided as a thin layer on the inside of the gas discharge vessel by pouring, flushing or spraying. The coating is subsequently dried by means of hot air and burnt in at approximately 600° C. The layers generally have a thickness in the range from 1 to 50 μm.

SPECIFIC EMBODIMENT 1 a. Synthesis of $(Gd_{0.5}Y_{0.5})PO_4:5\%$ Ce

To manufacture the UV-A phosphor $(Gd_{0.5}Y_{0.5})PO_4:5\%$ Ce having an average grain size of 5 to 10 nm, the starting materials 15.00 g (41.38 mmol) $Gd_2O_3$, 9.344 g (41.38 mmol) $Y_2O_3$, and 3.783 g (8.71 mmol) $Ce(NO_3)_3 \cdot 6(H_2O)$ are suspended in dematerialized water. The suspension is treated by ultrasound for 10 minutes. Subsequently, 21.092 g (182.94 mmol) $H_3PO_4$ is added under intense stirring. Thereafter, the solvent is removed by distillation. The remaining powder is dried at 100° C., milled, and subsequently annealed at 600° C. for 1 h in air. After a thorough grinding step, and addition of 0.5 g LiF, the powder is annealed twice at 1000° C. for 2 h in air with an intermittent grinding step.

Finally, the powder is milled again, washed in 650 ml water at 60° C. for several hours, and dried at 100° C. Said $Gd_{0.5}Y_{0.5})PO_4:5\%$ Ce is crystalline and has an average grain size of 15 nm.

b. Tanning Lamp Comprising $(Y_{0.5}Gd_{0.5})PO_4:5\%$ Ce

A butyl acetate-based phosphor suspension comprising 99% $(Y_{0.5}Gd_{0.5})PO_4$: 5% Ce and 1% alon-c is prepared and sieved through a 36 μm mesh. Using a flowcoat-related procedure, the suspension is applied to the inner wall of a 290 glass tube. The viscosity of the suspension is adjusted in such a way that the resulting phosphor layer has a screen weight between 0.5 and 5.0 mg/cm$^2$.

After the coating processes, organic residues (binder etc.) are removed by an annealing step at 550 to 600° C. The lamp is subsequently filled with a few millibar Argon and with 1 to 50 mg Hg. Finally, electrodes are attached to the lamp and the tube is sealed.

The tanning lamp thus produced had the following coordinates on the CIE chromaticity diagram: x equals 0.300 and y equals 0.232.

After 500 hours in use, the lamp had a lumen output equal to 95% of its initial lumen output and showed only minor color drift (less than 3 SDCM).

This compares with a lumen maintenance of the lamp most commonly previously used for tanning of 82% after 500 hours, and a large color drift.

As will be appreciated from the above specific example, this invention provides tanning radiation which has improved lumen output and maintenance and exhibits only minor color drift.

Figure 1:
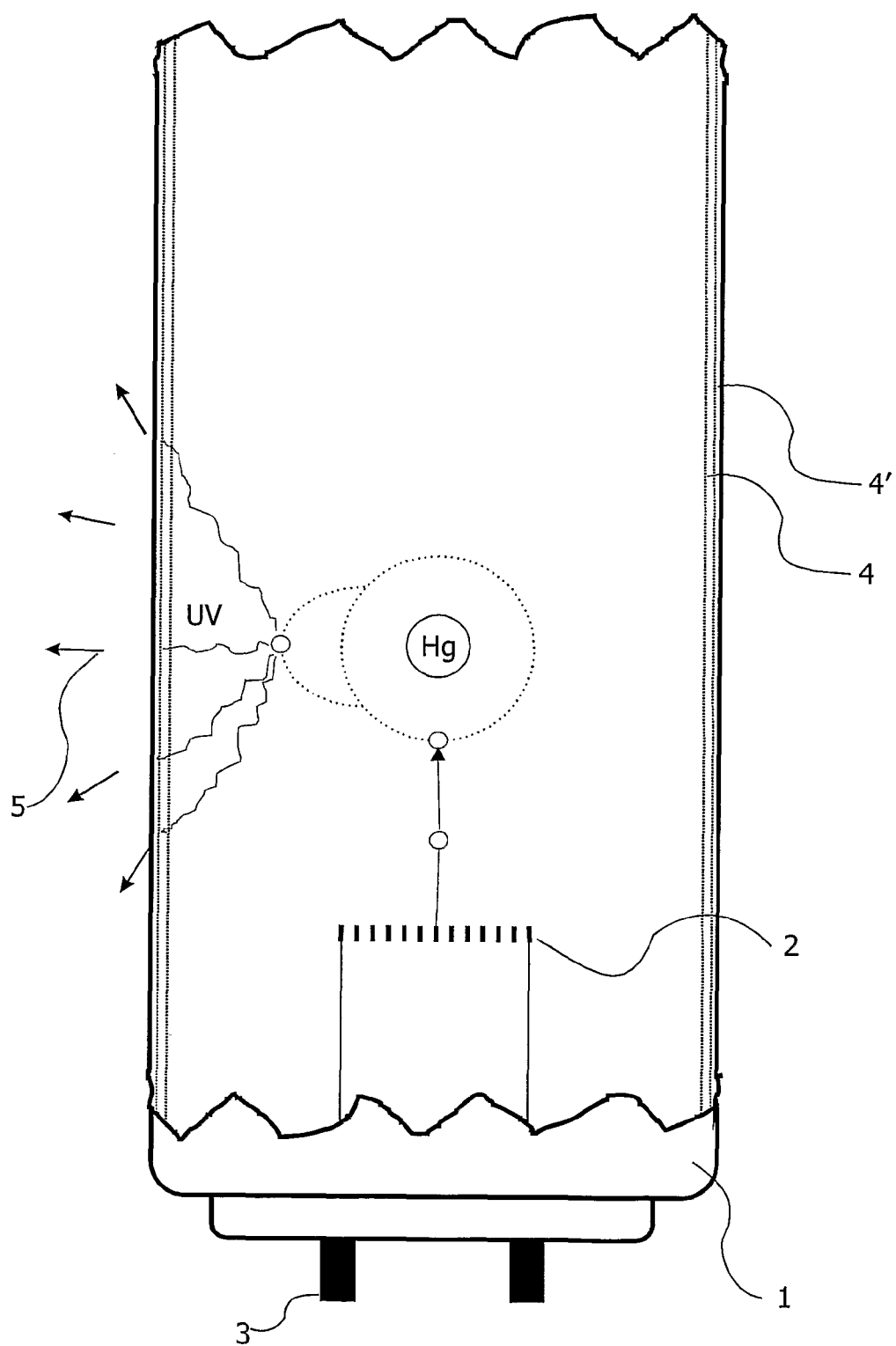
FIG. 1 shows an example of a low-pressure gas discharge lamp with a mercury filling, i.e. a fluorescent lamp, with two phosphor layers.
Figure 2:
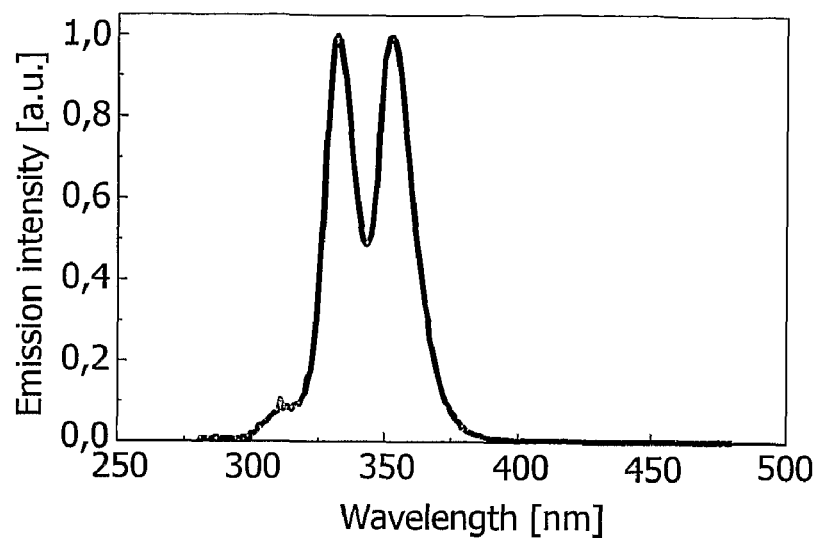
FIG. 2 shows the emission spectrum of $(Y_{0.5}Gd_{0.5})PO_4:5\%$ Ce
Figure 3:
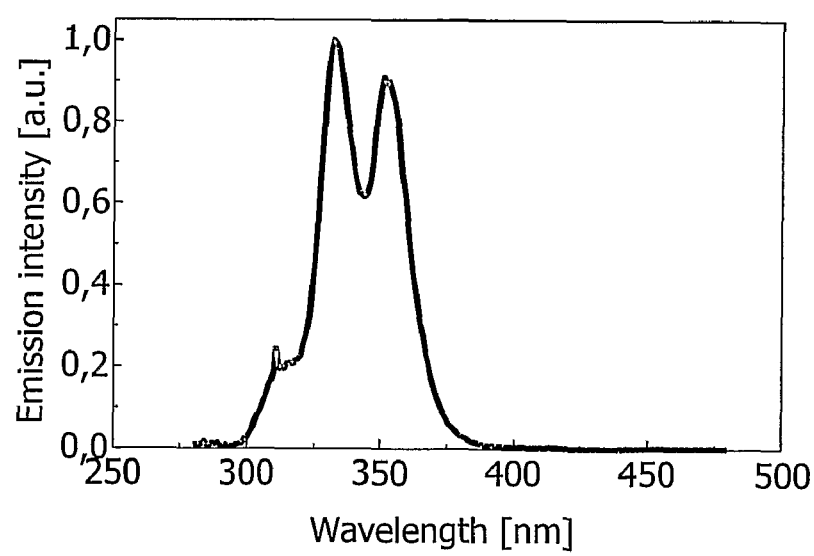
FIG. 3 shows the emission spectrum of $(Y_{0.5}Gd_{0.5})PO_4:10\%$ Ce
Figure 4:
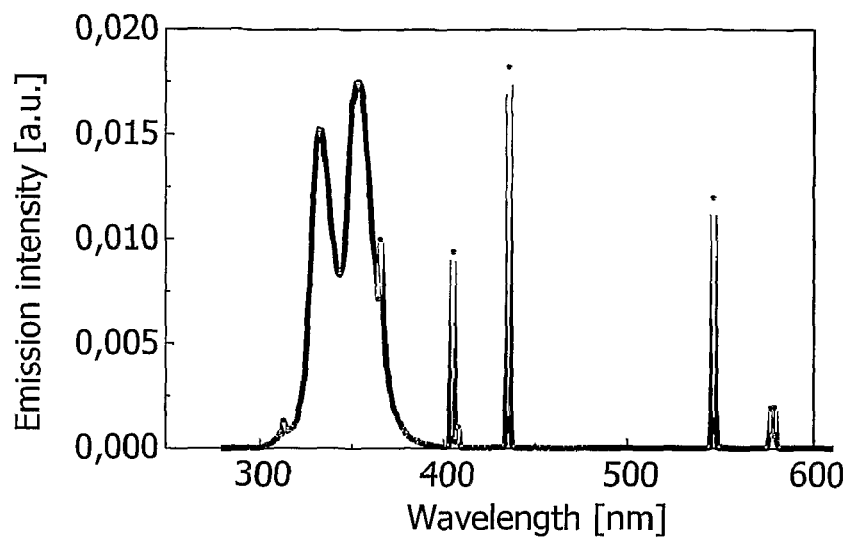
FIG. 4 shows the spectrum of a 100 W tanning lamp comprising $(Y_{0.5}Gd_{0.5})PO_4: 5\%$ Ce
Figure 5:
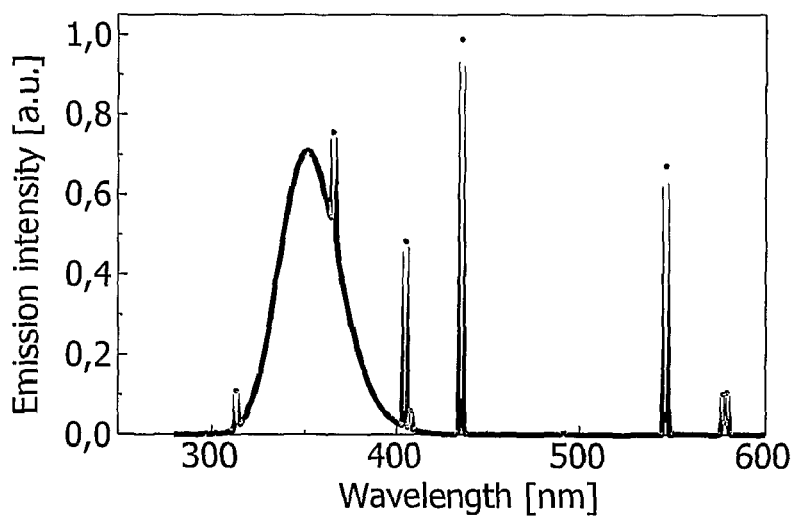
FIG. 5 shows the spectrum of a 100 W tanning lamp comprising $BaSi_2O_5:Pb$

The invention claimed is:

1. A low-pressure mercury vapor discharge lamp comprising a light-transmitting discharge vessel, said discharge vessel enclosing, in a gastight manner, a discharge space provided with a filling of mercury, at least a part of a wall of the discharge vessel being provided with a luminescent composition comprising a first UV-A phosphor of general formula $(Gd_{1-x-y-z}Y_xLu_y)PO_4:Ce_z$, wherein $0 \leq x<1.0$, $0 \leq y<1.0$; $0<z \leq 0.2$ and $x+y+z<1$, the low-pressure mercury vapor discharge lamp comprising also discharge means for igniting and maintaining an electric discharge in the discharge vessel.

2. A low-pressure mercury vapor discharge lamp as claimed in claim 1, wherein the luminescent composition also comprises an UV-B-phosphor.

3. A low-pressure gas discharge lamp as claimed in claim 2, wherein the UV-B phosphor is selected from the group comprising $SrB_4O_7:Eu$, $LaMgAl_{11}O_{19}:Ce$, $SrAl_{12}O_{19}:Ce$, a cerium-activated lanthanum gadolinium phosphate, or a blend thereof.

4. A low-pressure gas discharge lamp as claimed in claim 2, characterized in that the UV-A-phosphor is present in a first luminescent layer and the UV-B phosphor is present in a second luminescent layer.

5. A low-pressure gas discharge lamp as claimed in claim 1, wherein in the luminescent composition further comprises an additive selected from the group comprising $Al_2O_3$, $MgO$, and $MgAl_2O_4$.

6. An UV-A phosphor of general formula $(Gd_{1-x-y-z}Y_xLu_y)PO_4:Ce_z$, wherein $0 \leq x < 1.0$, $0 \leq y < 1.0$; $0 < z \leq 0.2$ and $x+y+z<1$.

7. An UV-A phosphor as claimed in claim 6, wherein $x=0.5$, $y=0$; $0<z \leq 0.1$ and $x+y+z<1$.

8. An UV-A phosphor as claimed in claim 6, comprising a co-activator selected from the group comprising Tb(III), Eu(II), Mn(II) and Sb(III).

9. An UV-A phosphor as claimed in claim 6, comprising additionally an anion selected from the group comprising arsenate and vanadate.

10. An UV-A phosphor as claimed in claim 6, having a grain size of 10 nm<d<500 nm.

11. A method for inducing cosmetic or medical tanning of human skin comprising irradiating the human skin with a lamp according to claim 1.

12. A method for inducing cosmetic or medical tanning of human skin comprising irradiating the human skin with a lamp comprising a phosphor according to claim 6.

* * * * *